(No Model.) 2 Sheets—Sheet 1.

A. WILT.
CHECK ROWER.

No. 345,563. Patented July 13, 1886.

Attest
A. Willis Bain,
Nella Robb.

Inventor
Ambrose Wilt
By Paul A. Staley
Atty.

(No Model.) 2 Sheets—Sheet 2.

A. WILT.
CHECK ROWER.

No. 345,563. Patented July 13, 1886.

Attest
P. Willis Baines.
Nella Robb.

Inventor
Ambrose Wilt
By Dane A. Staley
Atty

UNITED STATES PATENT OFFICE.

AMBROSE WILT, OF BOURNEVILLE, OHIO.

CHECK-ROWER.

SPECIFICATION forming part of Letters Patent No. 345,563, dated July 13, 1886.

Application filed November 3, 1885. Serial No. 181,783. (No model.)

*To all whom it may concern:*

Be it known that I, AMBROSE WILT, a citizen of the United States, residing at Bourneville, in the county of Ross and State of Ohio, have invented certain new and useful Improvements in Check-Rowers, of which the following is a specification.

My invention relates to check-row cornplanters; and the object of my invention is to provide a planter of novel construction, adapted to automatically drop the grain in hills at an equal distance apart, without the use of the wire commonly used with checkrower devices.

My invention consists in the combinations and constructions of parts hereinafter described, and pointed out in the claims.

Figure 1:
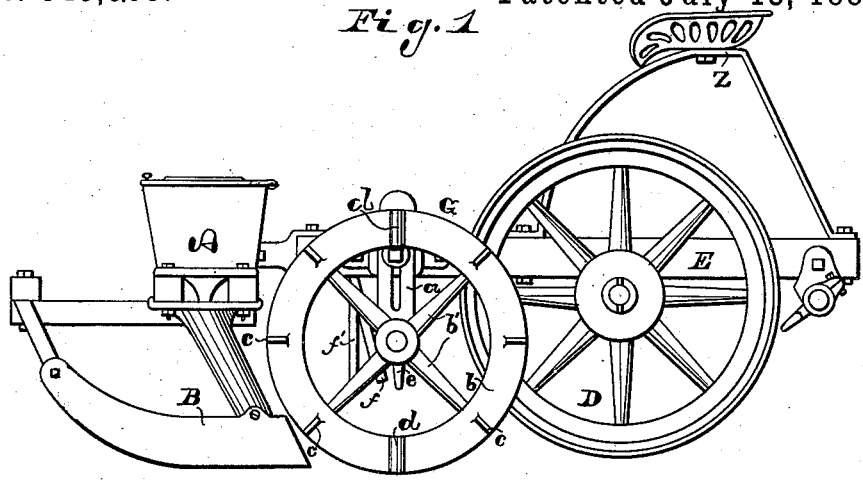
Figure 2:
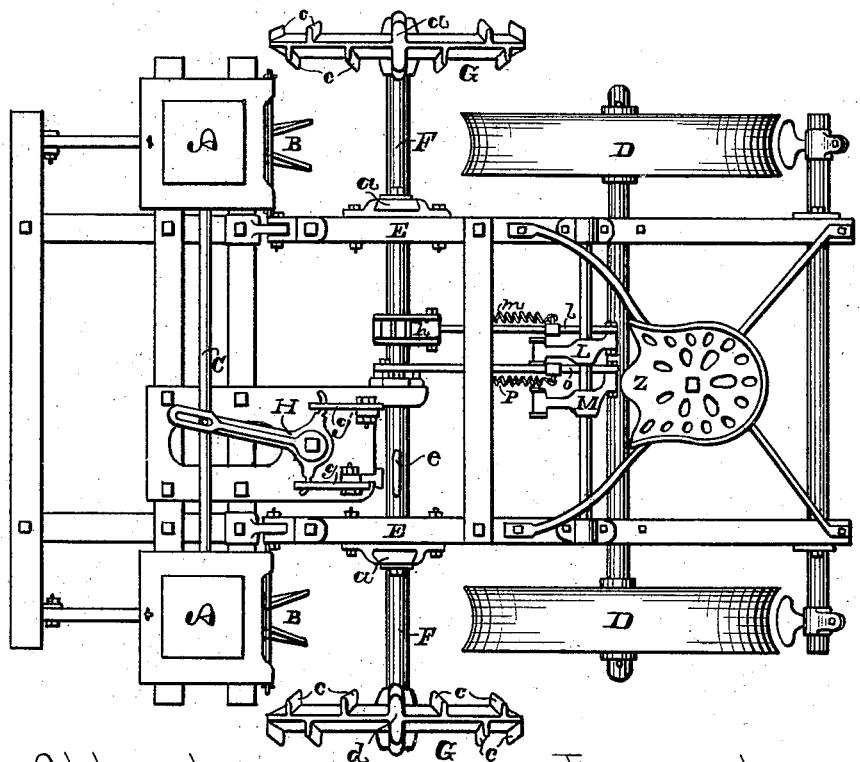
Figure 3:
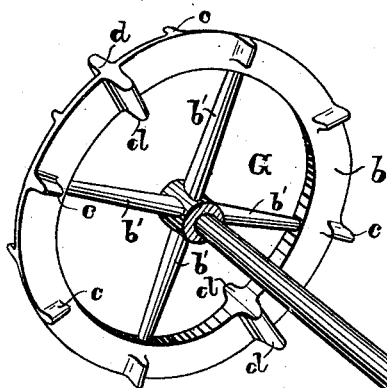
Figure 5:
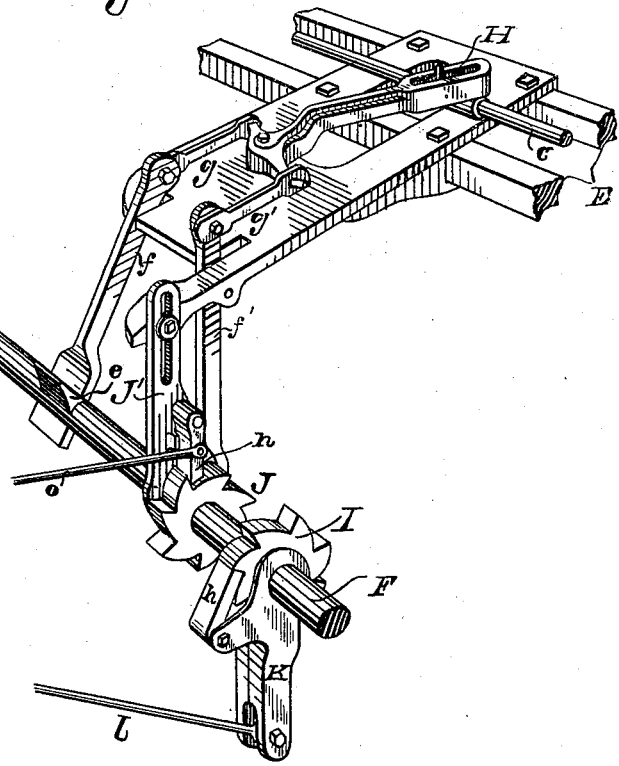
Figure 5:
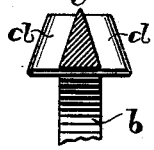
Figure 4:
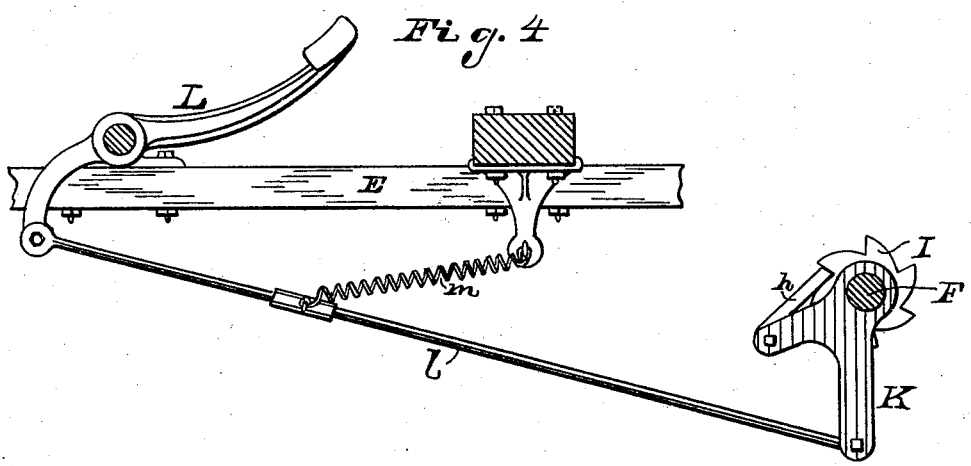

In the accompanying drawings, Figure 1 is a side elevation of a planter embodying my invention. Fig. 2 is a plan view of the same. Fig. 3 is a perspective view of the dropping mechanism in detail. Fig. 4 is a detailed view showing mechanism for changing the position of the dropping-wheels so as to bring the hills in check, and Fig. 5 is a vertical sectional view the dropping-wheel.

In the said drawings, A A represent the grain-hoppers, which are arranged at each side of the machine over the shoes B B and provided with mechanism therein adapted at each stroke of the slide C to drop the required number of grains to form a hill in the ordinary manner.

D D are the supporting and covering wheels, which support the rear portion of the frame, and also serve to cover the grain in the usual way.

Located between the shoes B and the wheels D on the frame E is a shaft, F, on each end of which is a wheel, G, of peculiar construction, which I term the "dropping-wheel." The shaft F is supported from the frame E by adjustable bearings $a$, so that the shaft may be raised or lowered in relation to the frame E. The wheels G each consist, preferably, of a circular rim, $b$, and spokes $b'$. The rim $b$ is made in cross-section of a V shape, and is adapted to cut into the ground to a sufficient depth to prevent slipping, the said wheel being provided on the opposite faces thereof with alternating lugs C, placed thereon to give a firm hold in the ground and insure the turning of the wheel as the planter is drawn forward. The dropping-wheels are preferably made of the proper size, so that the circumference thereof is just equal to the distance between two hills of the dropped grain, said wheels being provided on opposite sides with lugs $d\ d$, placed opposite each other on each face of the rim $b$. These lugs $d$ are termed the "marking-lugs," and differ from the traction-lugs C in the fact that they stand opposite each other on the respective faces of the wheel, while the traction-lugs are placed alternately. The marking-lugs are also preferably made larger than the traction-lugs. The dropping and marking-wheels G are secured rigidly on each end of the shaft F, which is preferably made of sufficient length to bring the wheels outside of the dropped grain.

The shaft F is provided near the center with cam lugs or projections $e\ e'$ on opposite sides thereof, which are adapted as the shaft is revolved to come in contact with the lower ends of the vibrating levers $f f'$. These levers $f f'$ are connected at the upper end by links $g\ g'$ to the respective ends of the cross-bar of the T-shaped vibrating arm H, which is in turn connected to and adapted to move the dropping-slide C. Now, it will be seen that as the machine is drawn forward the wheels G and shaft F will be revolved, and at each revolution the cam projections on the shaft, coming in contact with the levers $f f'$, will produce a longitudinal movement of the slide C in each direction, thus dropping two hills of grain. The cam projections $e\ e'$ are so placed in relation to the marking-lugs $d$ on the wheels G that the hill is dropped opposite the point marked by the said lugs, so that a guide is thus formed at all times by which any inaccuracy in the dropping may be detected at once.

In order that any inaccuracy in the dropping may be readily remedied as soon as discovered, I provide means by which the dropping of the hill may be advanced or retarded as desired, and thus bring the hills in check. This I accomplish as follows: On the shaft are rigidly secured two ratchets, J and I, the teeth of which are adapted to act in opposite directions. Journaled on the shaft F on each side of the ratchet I is an oscillating arm, K, in which is pivoted a pawl, h, adapted to engage the teeth of the said ratchet I. Attached to the lower end of the arm K is a rod, l, the other end of which is attached to a foot-lever, L, pivoted at the rear of the machine near the seat Z. A downward pressure on the foot-lever L is adapted to produce a longitudinal movement of the rod l, which turns the arm K on the shaft. This movement of the arm K causes the pawl h to engage with the teeth of the ratchet I, and thus turn the wheel in a forward direction. A spring, m, serves to return the foot-lever F to its normal position, when the pressure is relieved therefrom. By this arrangement, in case the hills are not dropped soon enough to check with those in the last preceding row, the driver, by a pressure of his foot, may advance the wheels G sufficiently to bring the hills in the proper position. Pivoted on a supporting-piece, J', is a pawl, n, the lower end of which is adapted to come against the face of the teeth in the ratchet J. Connected to this pawl n is a rod, O, which is attached at the other end to a foot-lever, M, by means of which the pawl may be held against the ratchet J, and thus hold the shaft F from revolving. A spring, P, connected to the rod O, serves to return the foot-lever to its normal position when the pressure thereon is removed. By pressing down the foot-lever M, and thus bringing the pawl n in contact with the ratchet I when the planter is being drawn forward, it will be seen that the wheels G may be held from revolving, so that in case the hills are dropped too quick the dropping may be retarded until the proper point is reached. The dropping and marking wheels G, being located between the shoes B and the supporting-wheels D, are supported by the frames E, so as to cut into the ground at a uniform depth, which may be regulated to suit different kinds of soil by means of the adjustable bearings a. The wheels by their peculiar construction are adapted to cut through all the little inequalities in the surface of the ground, so that the distance between the hills will not be affected by said inequalities. If desired, the bearings a may be connected by suitable means to a lifting-lever provided with a suitable ratchet and pawl in reach of the driver, so that the depth of cutting may be changed at any time without stopping the machine. The dropping and marking wheels G being placed outside the shoes B, the track of one of the said wheels while planting will come in close proximity to the track made in planting the last preceding row. In this way any variation in the planting may be readily detected by the driver and remedied as above described.

In order that the raising and lowering of the shaft will not affect the length of the stroke of the dropping-slide, the levers f f' are so arranged that when the lower end thereof is moved to the greatest distance from the shaft the said levers will be in a vertical position.

Having thus described my invention, I claim—

1. The combination, with the driving-shaft located between the planting and covering devices, and provided with marking-wheels on the outside of the line of the dropped grain, said wheels being adapted to check the point at which the grain is dropped, of a pawl-and-ratchet mechanism, substantially such as described, adapted to revolve said driving-shaft in a forward direction, and thus advance the marking-wheels to bring them in check, substantially as specified.

2. The combination, with the driving-shaft having the dropping-wheels secured thereto, and provided with the cam projections thereon, of the T-shaped lever, the longer arm of which is connected to the dropping-slide, and vibrating levers connected at one end by suitable links to the outer ends, respectively, of the cross-arm of said T-shaped lever, said vibrating levers being adapted to be engaged at the other end, and thus operated by the cam projections on the said shaft, substantially as and for the purpose set forth.

3. The combination, with the driving-shaft having the marking-wheels rigidly secured thereto, and the dropping-slide connected by suitable means to said shaft, and adapted to be operated thereby, of the ratchet I, lever K, pawl h, and the foot-lever connected to said lever K, substantially as and for the purpose set forth.

4. The combination, with the driving-shaft having the marking-wheels thereon, of the ratchet J, pawl h, rod O, and foot-lever M, substantially as specified.

5. The combination, with the driving-shaft and marking-wheels, provided with a V-shaped rim having tractive and marking lugs thereon, of the cam projections on said shaft, the vibrating levers connected at their upper ends to the T-shaped arm, said T-shaped arm being connected to the dropping-slide, the ratchets on the said shaft, the pawls adapted to engage said ratchets, and foot-levers attached by suitable means to said pawls, whereby the said shaft may be advanced or retarded, substantially as set forth.

In testimony whereof I have hereunto set my hand this 26th day of October, A. D. 1885.

AMBROSE WILT.

Witnesses:
WM. R. KERAN,
JAMES C. GRAGG.